United States Patent [19]

Patil

[11] 3,824,409

[45] July 16, 1974

[54] ARBITER CIRCUITS

[75] Inventor: Suhas S. Patil, Lexington, Mass.

[73] Assignee: Massachusetts Institute of Technology, Cambridge, Mass.

[22] Filed: June 12, 1972

[21] Appl. No.: 261,849

[52] U.S. Cl. .................. 307/232, 307/215, 307/241, 307/291, 328/99, 328/137, 328/152, 340/147 LP

[51] Int. Cl. ... H03k 17/28, H03k 17/30, H03k 19/20

[58] Field of Search ....... 307/232, 241; 340/147 LP; 328/99, 137, 152

[56] References Cited

UNITED STATES PATENTS

| | | | |
|---|---|---|---|
| 3,103,632 | 9/1963 | Kaiser | 328/137 X |
| 3,175,189 | 3/1965 | Willyard et al. | 307/241 X |
| 3,202,841 | 8/1965 | Kunzke | 340/147 LP |
| 3,263,175 | 7/1966 | Stahl | 307/241 X |
| 3,300,758 | 1/1967 | Hawley | 340/147 LP |
| 3,441,809 | 4/1969 | Newland | 307/232 X |
| 3,462,738 | 8/1969 | Chemla et al. | 307/241 X |
| 3,515,998 | 6/1970 | Adams et al. | 328/99 X |
| 3,634,769 | 1/1972 | Sleater et al. | 328/152 X |
| 3,668,436 | 6/1972 | Bacon | 307/208 X |

*Primary Examiner*—Rudolph V. Rolinec
*Assistant Examiner*—William D. Larkins
*Attorney, Agent, or Firm*—Arthur A. Smith, Jr.; Martin M. Santa; Robert Shaw

[57] ABSTRACT

An infinite resolution electronic arbiter circuit is described which provides a signal at one of its outputs within a known time with a very small possibility that a signal also appears on its other output. Finite resolution arbiter circuits are cascaded with a delay element interposed between one arbiter output and the input of the other to provide an arbiter circuit having infinite resolution. Finite resolution arbiter circuits are shown constructed from both C and C′ circuits.

10 Claims, 25 Drawing Figures

ARBITER CIRCUITS

This invention relates to an infinite resolution electronic arbiter circuit which provides a signal at one of its outputs within a known time with a very small possibility of error. The infinite resolution arbiter can be fabricated from finite resolution arbiter circuits which are cascaded with a delay element in all lines except one connecting the outputs of one finite resolution arbiter to the inputs of a second finite resolution arbiter. Finite resolution arbiters are described from new circuits called C′ circuits and from C circuits.

The invention will become apparent from the following description in conjunction with the drawings in which:

FIG. 6(*b*) is a transition diagram for a C′ circuit.

FIG. 6(*c*) is a schematic diagram of a C′ circuit.

FIG. 10 (*b*) is a graph of the probability *p*.

FIG. 14(*b*) is circuit for determining permissible delay in FIG. 14(*a*).

Figure 1:
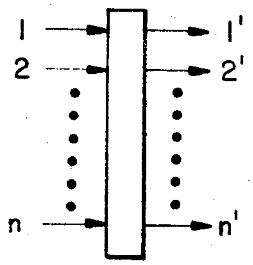
FIG. 1 is a multi-input arbiter circuit block diagram.

An electronic arbiter has a number of input-output pair of wires (FIG. 1). Each input-output pair of wires under normal condition behave as though they were internally connected, but under certain conditions which will be explained below the arbiter may hold back a 0 to 1 change on an input wire from reaching the output wire. This arises when there is a possibility of more than one output wire of the arbiter being in level 1; the arbiter is to prevent more than one output wire from being at level 1 at the same time.

The arbiter performs this task by delaying certain 0 to 1 changes on input wires from reaching the output as long as it is necessary to fulfill the requirement that at most one output wire is at level 1 at any given time. When an input changes to 1 while the others remain at 0, the change in level of this wire reach the corresponding output wire without any obstruction. Now, if another input should change to 1, it will be held up at the arbiter until the previous input returns to 0 and the corresponding output goes to 0. Either of the situations just discussed do not pose much difficulty to an arbiter. The critical operation of the arbiter is when one or more inputs change from 0 to 1 at the same time (or at nearly the same time). In this case the arbiter must choose one input to go through and block the other inputs. When two inputs change to 1 very close to each other it may not be possible to tell which one came first, in which case the arbiter must make an arbitrary choice. Important requirements on the operation of an arbiter are:

i. changes on input wires must be so blocked by the arbiter that at most one output wire should be at level 1 at any given time; ii. if no output wire is at level 1 and some input wire is at level 1 then the arbiter must promptly proceed to change the level of one corresponding output wire to 1. The arbiter which is the subject of this invention is highly reliable in meeting condition (i) and performs task set in condition (ii) with great speed and in known length of time.

One of the most common uses of arbiters is in restricting access to a resource unit which can be used by only a limited number of users at a time. For example in a computer an arbiter is required to prevent two processors from accessing a memory unit at the same time. A similar situation arises when a data channel is to be shared among several users of the channel. Situations demanding arbitration arise in places other than computers as well. A policeman regulating traffic at a cross road performs the task of an arbiter. If one desires to hand over the traffic control to a good quality electronic control which is flexible to the demand of the traffic, we would need an electronic arbiter.

The difficult aspect of obtaining an arbiter is in resolving which input changed to 1 first and in handling the situation in which the input changes occur so close in time that the difference in the time of their arrival cannot be resolved by the components used in the construction of the arbiter. The arbiter is required to perform correctly even in these situations.

The basic difficulty comes from the fact that any circuit or known circuit component that has memory in it such as a flip flop, may not settle into one of the two stable state (0 and 1) for indefinite period following operation under conflict. A conflict is a situation in which one signal tries to set a flip-flop in one direction and at the same time another signal tries to set the flip-flop in the other direction. A flip flop considered as an ideal device, is always in either state 0 or state 1 at any given time, but a physically implemented flip flop may, when operated in conflict, get into a meta-stable state which is neither 0 nor 1, and the flip flop may remain in this state for indefinite length of time. The length of time for which a meta stable state lasts is random and is best characterized by probability. There is no certainty that the flip flop will come out of the meta-stable state even if we wait for 10 times the normal time of operation. It is felt that the difficulty stated above is a fundamental one and it has fundamental effect on arbiters to the extent that it is felt that a perfect arbiter which operates in a known length of time and which is guaranteed not to make an error cannot be physically realized. The next best thing would be an arbiter which operates in a short length of time and whose failure rate can be made very very small such as one every million years. In other words, the probability of the arbiter failure due to the fundamental limitations mentioned above could be made smaller than the probability of component failure that all physical circuits are subject to. The invention describes a scheme to obtain just such an arbiter.

Figure 2:
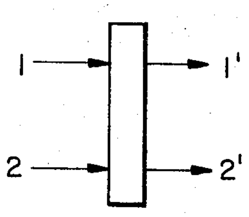
FIG. 2 is a two-input arbiter circuit block diagram.
Figure 3:
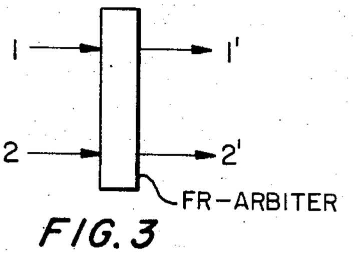
FIG. 3 is a two-input finite resolution arbiter circuit block diagram.

Now to explain the scheme underlying the invention, consider the basic two input arbiter, as in FIG. 2. A two input arbiter is considered basic because it is the smallest arbiter and because the multi-input arbiters can be constructed from it. Now instead of trying to construct the desired arbiter all at once, let us consider a simpler arbiter which we call a finite resolution arbiter (FR-arbiter), (FIG. 3), which has two inputs and two outputs just as the two input arbiter and whose operation is identical to an arbiter when the signals come sufficiently apart that they can be distinguished as to their time of arrival, but when the signals come very close the FR-arbiter, instead of stopping them, lets both of them go through. In other words, an FR-arbiter has a certain resolution window, which is like a knife edge with which the arbiter tries to differentiate between the time of arrival of inputs. But when the time difference between signals is smaller than the resolution window, both of them fall through the window. We shall later see how such a device can be constructed. But for now let us concentrate on how this device fits in the scheme for the construction of a reliable arbiter which operates in a known length of time regardless of how close or how far apart the signals sent to it are.

Figure 4:
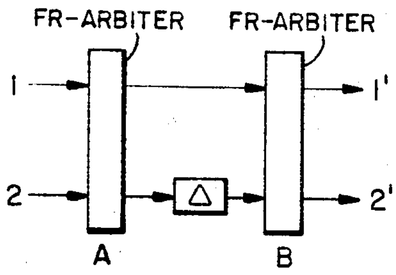
FIG. 4 is a block diagram of a two-stage arbiter constructed of finite resolution arbiters.

The scheme is shown in FIG. 4. The scheme is based on the fact that the resolution window of the FR-arbiter is small. Therefore when the signals come very close to each other and fall through the resolution window of the FR-arbiter they come out of the FR-arbiter close to each other. On the way to the second FR-arbiter one signal is delayed relative to the other signal sufficiently so that it arrives at the second FR-arbiter after the other signal separated by time longer than the resolution window of the FR-arbiter. Therefore, the first signal goes through and the second one is successfully blocked at the second FR-arbiter.

The above scheme resolves conflict between two inputs like a perfect arbiter when the signals either come far apart or come very close to each other. The case that needs special attention is one in which the second input follows the first one by a time equal to the resolution window of the FR-arbiter. Let us say that the signal on input 2 (0 to 1 change) comes first (FIG. 4), and the signal on input 1 follows this signal by a time equal to the resolution window of the first FR-arbiter. Now the signal received on input 2 will go through without any obstruction but there is uncertainty as to whether the signal on input 1 gets blocked or goes through. The situations in which the signal either gets blocked or goes through without undue delay poses no problem. But it has been explained earlier that under conflict situations such as this, circuits having memory (e.g., flip flops) do not act one way or the other in definite length of time. As such there is certain probability that the signal on input 1 will experience some arbitrary delay. Furthermore there is some probability that this arbitrary delay may be nearly equal to the explicit delay $\Delta$ on the path of input 2 between the first and the second FR-arbiter. When such a delay is experienced by input 1, both inputs arrive at the second FR-arbiter at nearly the same time, and if the signals arrive close enough to fall within conflict window they will both get through the second FR arbiter.

Notice carefully that for the failure to occur it is not enough for the input 1 and 2 to arrive at the first FR-arbiter at nearly the same time. But, (i) the difference between their time of arrival must be very very close to the length of resolution window, so that there is a conflict, and (ii) the conflict must result in a delay which is close to the amount of delay $\Delta$ explicitly introduced in one of the inputs between FR-arbiter 1 and 2. Note that conflict gives rise to arbitrary delay; but for failure to occur this delay must fall in some specific narrow bounds, and the probability of this happening is small. Therefore, the two stage arbiter shown in FIG. 4 has a low probability of failure.

Figure 5:
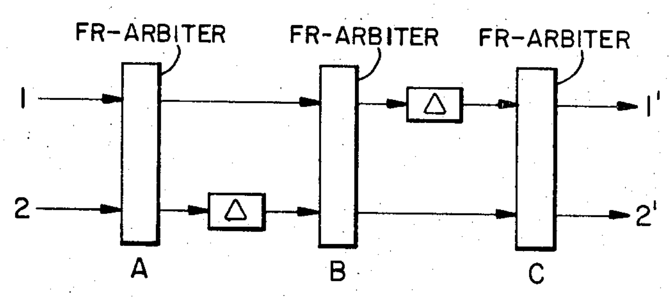
FIG. 5 is a block diagram of a three-stage arbiter.

We can further decrease the probability of failure by adding yet another stage of FR-arbiter as shown in FIG. 5. The probability of failure of the $n$ stage arbiter is $q^{n-2}* p$ where $q$ represents the probability of failure of a stage due to signals arriving with such timing as to cause a conflict and $p$ is the probability of failure of the last stage due to signals arriving within the conflict region. The significance of the scheme is that choosing appropriate number of stages we can make the probability of failure as small as we desire. Values of $p$ of the order of $10^{-8}$ and value of $q$ of the order of $10^{-10}$ are not hard to obtain. Then a three stage arbiter would have probability of failure equal to $10^{-10}*10^{-8}$ which is equal to $10^{-18}$. The significance of this number is that even if the arbiter is used 10 million times each second in the critical fashion, the mean time between failure will be 1,000 years. And the probability of failure of a four stage arbiter would be $10^{-28}$ which at the rate of use mentioned above would have a mean time of failure better than one every 1,000 million years! It is therefore clear that the probability of failure due to the fundamental limitation of the uncertain operation under conflict can be made negligible compared to probability of physical failure all components are subject to.

The delays in FIG. 5 are put on different lines so that no one line would have excessive delays.

Figure 6A:
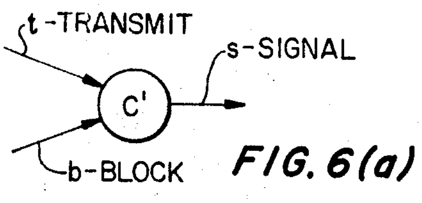
FIG. 6(*a*) is a schematic representation of a C′ circuit.
Figure 6B:
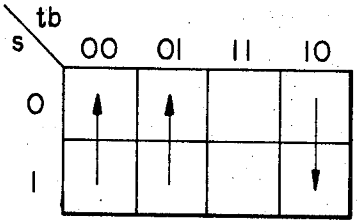
Figure 6C:
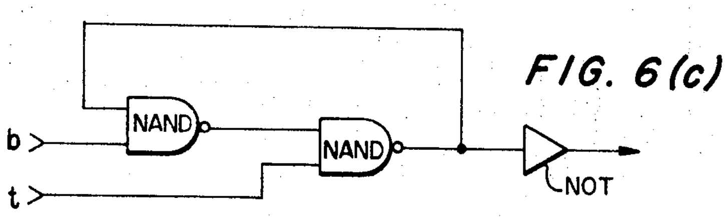

Let us now consider how a finite resolution arbiter can be constructed. In this construction we make use of a circuit element called C′ which we describe first (FIG. 6). C′ is a circuit element such as a flip flop is. It has two inputs $t$ and $b$ and one input $s_a$; $t$ refers to transmit, $b$ refers to block and $s$ refers to signal. In use of C′ element both $t$ and $b$ are initially 0. Now if $t$ goes to 1 while $b$ remains at 0, then output $s$ goes to 1. On the other hand if $b$ goes to 1 before $t$, then $s$ is locked at 0. In any case when $t$ becomes 0 the output also becomes 0 if it is not already 0. A transition diagram specifying the C′ element is shown in FIG. 6b. A circuit for C′ using NAND gates and NOT gates is shown in FIG. 6c. Important subtleties of this circuit will be explained later. The circuit is presented here to explicate what C′ is supposed to do. The conflict situation for C′ circuit arises when both $t$ and $b$ become 1 at the same time. In this case there is no certain way of telling how much time will elapse before $s$ will change to 1 if it does at all. The important thing is that $s$ will remain at 0 until the time of change comes and at that time it will swiftly change to 1.

Figure 7:
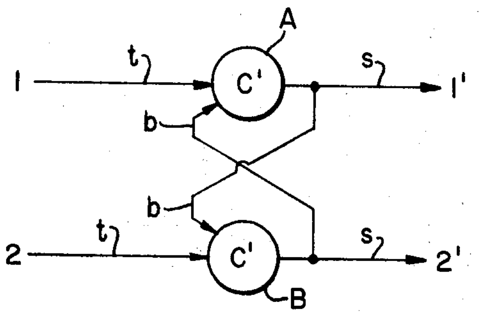
FIG. 7 is a finite resolution arbiter circuit.

A two input FR-arbiter is obtained from the C′ circuit by interconnecting them as shown in FIG. 7. Let us now consider the operation of this FR-arbiter in some detail starting from the initial condition when all levels are 0.

If input 1 changes to 1 while input 2 remains 0, the output of the C′ element associated with this input goes to 1 and the C′ associated with the other input is blocked so that signal coming on input 2 will be blocked. Later when input 1 goes to 0, output 1′ goes to 0 and C′ associated with input 2 is unblocked so that if input 2 is waiting to go through, it may do so.

The resolution window of this FR-arbiter is given by the sum of time the C′ circuit takes to operate and the time a block signal takes to establish its hold on a C′ circuit. To examine this consider the above situation once again. There is a certain time elapse between the change in input 1 and blocking of the C′ associated with the other input. This time equals $\delta_1 + \delta_2$ where $\delta_1$ is the time a signal takes to propagate through C′, and $\delta_2$ is the time the block signal takes to block a C′ circuit. We will call $\delta = \delta_1 + \delta_2$ as the resolution window of the FR-arbiter because if input 2 changes to 1 before this time, this input will also get through the FR-arbiter.

Note that critical operation arises when input 2 changes to 1 just as the C′ circuit B is being blocked. In this situation the C′ circuit may or may not succeed in blocking the signal. Moreover the signal may get through but may experience arbitrary amount of delay.

Thus we see that the resolution window of a FR-arbiter consists of a coincidence window which is $\delta_1$ units long and a conflict window which is $\delta_2$ units long. And we can summarize the operation of the FR-arbiter into three cases:

i. The signals come more than $\delta_1 + \delta_2$ apart in which case the FR-arbiter successfully resolves them; the first one goes through without appreciable delay and the second one is blocked.

ii. The signals are closer than $\delta_1$ units of time in which case they fall in coincidence window and both of them go through without appreciable delay.

iii. The signals are between $\delta_1$ and $\delta_1 + \delta_2$ apart in which case they fall in conflict window; the first signal goes through without appreciable delay and the second one may experience arbitrary delay.

In the above discussion, "without appreciable delay" means without any more delay than normal propagation delay of the C′ element.

Figure 8:
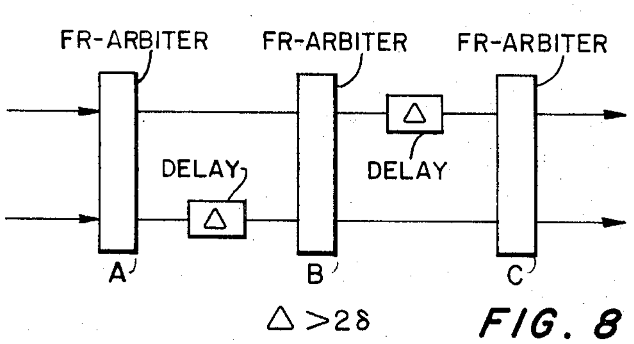
FIG. 8 illustrates the delay time requirements for the multistage arbiter.

The construction of a three stage arbiter with FR-arbiters is shown in FIG. 8. The Δ delays must be longer than twice the resolution window of the FR-arbiters.

I will now show a worst case analysis of the multistage two input arbiter. The multi-stage arbiter fails only if each stage in it fails to resolve the conflict between the inputs (resolution of conflict means allowing one signal to go through and stopping the other one). The only kind of error this arbiter has is one referred to above, namely not stopping the second input. The arbiter always acts within a fixed time after the arrival of the first signal. This is so because even in the case of conflict one of the signals goes through without undue delay.

In the case of the multi-stage arbiter, both signals will get through it only if they arrive within the conflict region for the first FR-arbiter and at each stage experience such delay that at the next stage they arrive in conflict region and finally arrive at the last stage within the resolution window. The situation called for at each stage depends on an independent probabilistic phenomenon. Therefore the net probability of the failure is product of the probability at each stage.

Figure 9:
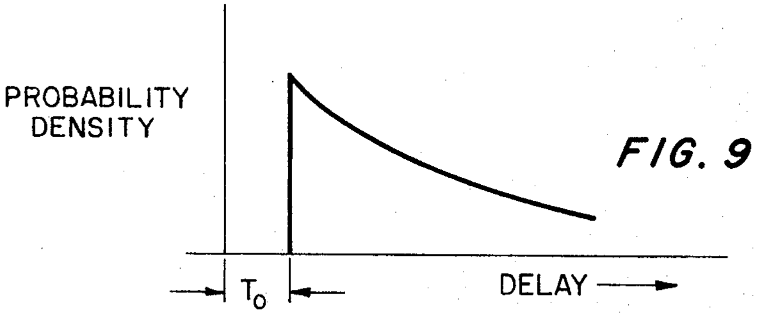
FIG. 9 is a graph of probability density distribution of the delay.

Since we are performing a worst case analysis let us assume that whenever the inputs fall in conflict region (i.e., they are between $\delta_1$ and $\delta_1 + \delta_2$ units of time apart) the FR-arbiter enters into a meta-stable state. In such a situation the probability of the delay experienced by the second signal is given by the graph of probability density shown in FIG. 9. Further details of the probabilistic phenomenon are given below.

Figure 10A:
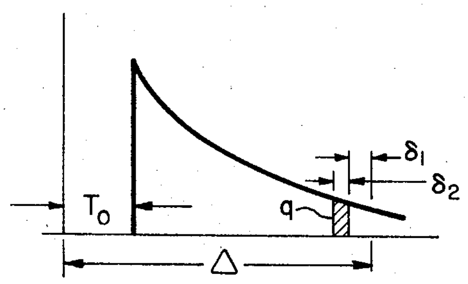
FIG. 10(*a*) is a graph of the probability *q*.

Now the probability that the delay at a stage are such that the signals arrive at the next stage in critical conflict region is given by the shaded area in FIG. 10*a*. Let us call this probability $q$.

It should be noted that both the situation in which signal 2 arrives after signal 1 between $\delta_1$ and $\delta_1 + \delta_2$ units of time and the situation in which signal 1 arrives after signal 2 between $\delta_1$ and $\delta_1 + \delta_2$ units both represent conflict. But only one of these conflicts is critical; the situation in which a signal which has the Δ unit delay on the other end of the FR-arbiter, arrives late is not critical because its getting delayed due to conflict only improves the time separation between the signals and helps the next stage resolve the conflict. This is the reason why instead of having two shaded areas (corresponding to two conflict regions) we have only one shaded area in FIG. 10*a*.

Figure 10B:
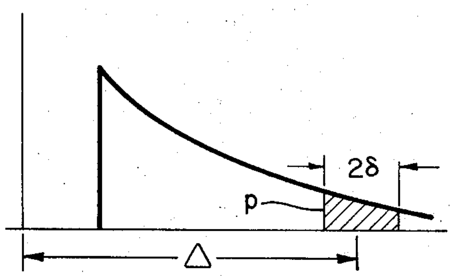

The probability of signals arriving within the resolution window at the last stage given that the previous stage has entered conflict, is shown by the shaded area in FIG. 10*b*. Call this probability $p$.

Then the probability of failure of an $n$-stage arbiter is given by $q^{n-2} * p$. The value of $q$ and $p$ depend on the choice of the delay Δ, the size of conflict and resolution windows and the quality of the circuit components.

Implementation of C′ Circuits

Figure 11:
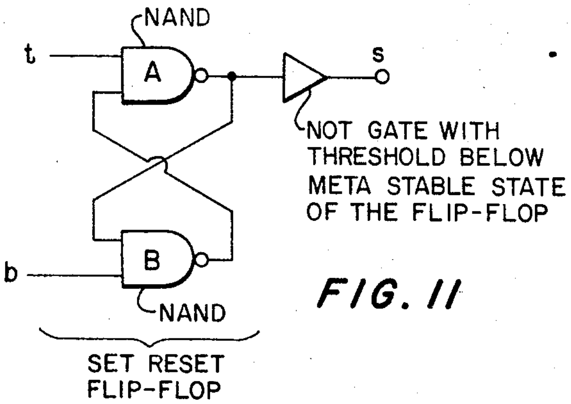
FIG. 11 is a schematic diagram of a C′ circuit.

There are many ways one could implement the C′ element. Here are some good implementations of the C′ element. A logic circuit for the C′ element is shown in FIG. 11. This circuit uses two NAND gates and one NOT gate. The NAND gates constitute a circuit commonly known as a set-reset flip flop. The use of the NOT gate between point $x$ and the output is important. In addition to obtaining the complement of the logic level of $x$, the NOT gate serves to prevent the meta-stable state from affecting the logic level at the output. Now let us consider the operation of this circuit in greater detail.

Figure 13:
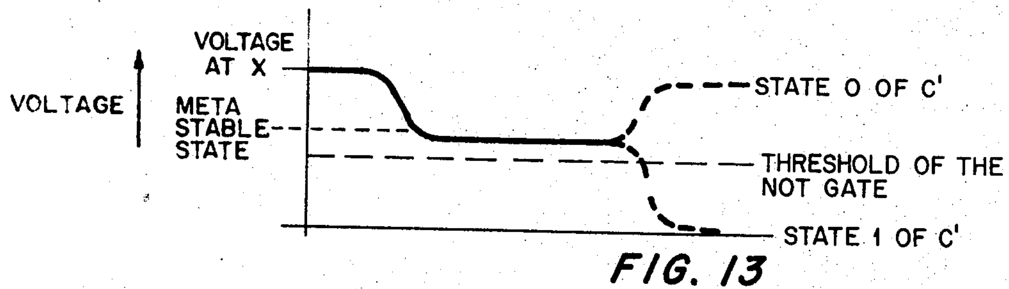
FIG. 13 is a graph of the threshold of the NOT gate.

Initially both $t$ and $b$ are 0. Therefore, $x$ and $y$ are both 1 and $s$ is 0. Now if $t$ goes to 1 while $b$ is still 0, then $x$ goes to 0 and $s$ becomes 1, and the flip flop is locked into state $x = 0$, i.e., because $x$ is 0, even if $b$ became 1 there will be no change in $y$ (the output of gate B), and therefore there will be no change in $x$ either. This is the case in which the signal (0–1 change) in $t$ (the transmit input) comes before the signal on $b$ (the block input). Now consider the case in which $b$ changes to 1 before $t$. In this case, since $x$ is 1 and $b$ becomes 1, $y$ changes to 0 and a 0 on $y$ blocks gate A, i.e., because $y$ is 0 the output of gate A will remain unaffected by changes in level of $t$. We will now examine the critical case in which both $t$ and $b$ become 1 at the same time. Recall that initially both $x$ and $y$ are 1 and therefore both gates A and B are ready to accept signal on $t$ and $b$. As $t$ and $b$ change to 1 together, $x$ and $y$ will both be heading towards 0 together and the effect of these changes in $x$ and $y$ would be to offset the influence of $t$ and $b$ on gates A and B respectively. In some cases the signals can so balance out each other that the circuit gets balanced in an intermediate state known as the meta-stable state FIG. 13. In this situation the level at point $x$ has a value which can be called neither 0 nor 1. The value at $x$ will remain at this level so long as the meta-stable state continues and then it will change to either 0 or 1. Note that if $x$ changes to 1, we conclude that the block signal has won its case, and therefore the output should not get any signal at all. This means that the output should not be affected by the meta-stable state; the output should get signal only when the level at $x$ goes sufficiently below the meta-stable state where it can be decisively called a level 0. This is achieved by use of a NOT gate whose threshold is adjusted below that of the meta stable state level. In ECL gates the adjustment of threshold is most easily achieved and many commercially available gates come with an input terminal for adjustment of the threshold; the voltage of such a terminal determines the threshold of the gate.

Emitter Coupled Logic implementation of the circuit shown in FIG. 11 is straightforward and uses standard NAND and NOT gates. The only improvement that need be made is that the gates should be of high gain compared to the ones commonly employed in logic. This is because the higher the gain the more unstable the meta-stable state will be — that is the circuit will get into meta-stable state less often and will come out of it sooner.

There are some important differences in details of the circuit shown in FIG. 11 depending on whether the circuit is implemented with Emitter Coupled Logic (ECL) or Transistor Transistor Logic (TTL). The differences arise because ECL gates have small propagation delay relative to the rise time while TTL gates have long propagation delay relative to the rise time of signals. The characteristics of Emitter Couple Logic is ideal for implementation of C′ because of the low propagation delay. Implementation of C′ circuit in ECL is therefore straightforward and uses standard NAND and NOT gates. The only improvement one might want to make to the standard gates is to increase their gain when viewed as amplifies. High gain gates improve performance of the circuit under conflict by making the meta-stable state highly unstable and thereby reducing the chances that a circuit will get into a meta-stable state and stay there for a long time.

The TTL gates have large propagation delay relative to the rise time of the signals. Large propagation delay means that there is a distinct time lag between the changes in the inputs to the gate and the resulting changes in the output of the gate. This delay can cause the flip flop to enter into oscillations. Oscillations of a flip flop are most undesired. This problem is in addition to the problem of meta-stable state which all flip flops are subject to. Fortunately I have discovered a way to prevent the oscillations.

Figure 12:
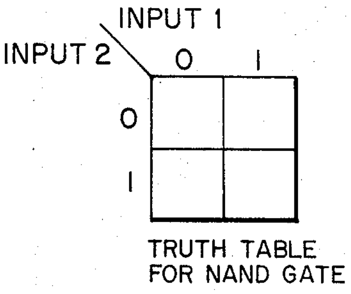
FIG. 12 is a truth table for a NAND gate.

The reason TTL gates have large propagation delay is that the transistors have saturation delays and TTL is a saturation logic (saturation cannot be eliminated in TTL). In the C′ circuit shown in FIG. 11, oscillations may arise in its operation if both NAND gates have about equal propagation delay. To briefly examine why this is so, consider the situation in which both gates have equal delay and levels at $t$ and $b$ rise to 1 at the same time. In this situation, since both $x$ and $y$ are 1, both gates A and B are ready to act. If they both act together $x$ and $y$ both become 0. Unfortunately, this condition is not a stable one either because a NAND gate with any input 0 tries to change the output to 1 (FIG. 12). If A and B have equal delays, they will change their output to 1 at the same time and the circuit finds itself at the beginning of the cycle from where the above changes had started. If the gate delays are slightly different, the circuit may oscillate a few times and then stabilize. In the extreme, if we purposefully make the delays widely different by using low saturation gate (fast acting gate) for B and a higher saturation gate (relatively slower acting gate) for A in the circuit shown in FIG. 11, we can eliminate the possibility of any oscillations in value of $x$. The explanation of why there is no oscillations is as follows:

When $t$ and $b$ both are changed to 1 at the same time, $x$ and $y$ change to 0 at about the same time (saturation affects propagation delay only in 0 to 1 transition at the output) but now even though both A and B are unstable, B, having low saturation, changes $y$ to 1 much before A gets a chance to change $x$, and with the value of $y$ changed to 1 the circuit attains a stable state.

The threshold of TTL NOT gate depends on choice of circuit. For example, 74H60 gate used as a NOT gate has threshold lower than other gates. So in construction of the circuit from commercially available components we can use 74S01 gates for B, 74H01 (or 7401) gates for A and 74H60 for the NOT gate. Variable threshold TTL gates are also manufactured commercially. They could be used in place of 74H00 if one desires.

Figure 14A:
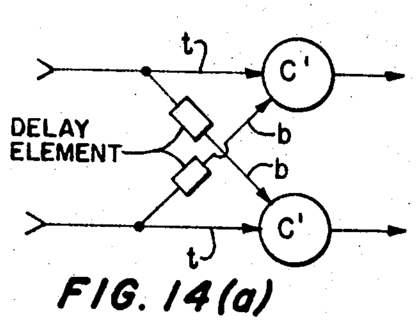
FIG. 14(*a*) is another schematic of a two-input finite solution arbiter.
Figure 14B:
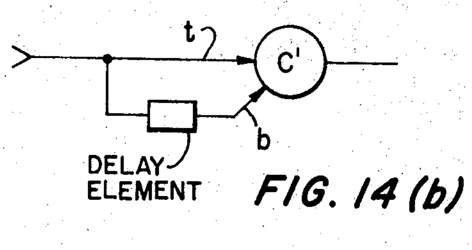
Figure 15:
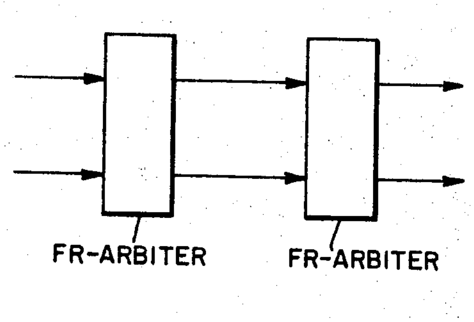
FIG. 15 is a tandem connection of finite resolution arbiters.
Figure 16:
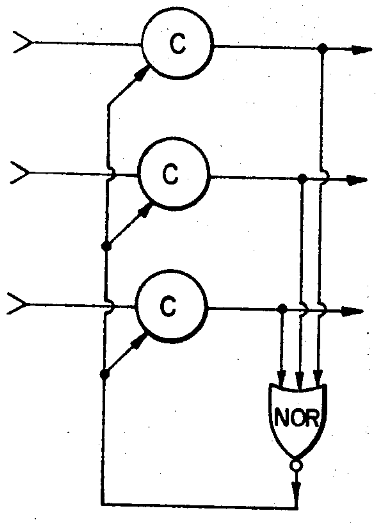
FIG. 16 is a schematic diagram of a multi-input finite resolution arbiter using C elements.

*Alternate implementation of FR-arbiter* — An implementation of two input FR-arbiter was shown in FIG. 7. Another implementation of two input FR-arbiter is shown in FIG. 14*a*. The value of the delay is chosen such that the circuit shown in FIG. 14*b* will pass changes on the input to the output. The resolution window of this FR-arbiter is $\delta_1 + \delta_2$ where again $\delta_2$ is the time required for a block signal to take effect. This circuit can be used with advantage in constructing FR-arbiters with narrow resolution window. One may connect FR-arbiters in tandum (FIG. 15) to improve upon the resolution window. But this method has the disadvantage that the propagation delay is doubled. Another useful implementation of FR-arbiter is with C elements. (FIG. 16). The C element is Muller's C-element as shown in D. E. Muller's "Asynchronous Logics and Application to Information Processing," *Switching Theory in Space Technology*, Stanford University Press, Stanford, Cal. 1963. Its function is as follows: When both inputs are 1 the output becomes 1 and when both inputs are 0 then output becomes 0. In other situations the output remains at 1 if it was at 1, and it remains at 0 if it was at 0. In this circuit wire $x$ is initially at 1. When any one of the inputs to the FR-arbiter goes to 1 the corresponding output goes to 1 and shortly after that the level at $x$ comes down to 0 so as to prevent any other input which may become 1 from going through. As in the previous case all those inputs which change to 1 before $x$ manages to become 0 get through the FR-arbiter. When all these inputs go to 0, $x$ goes to 1 so that any other waiting input may get a chance to go through.

Figure 17:
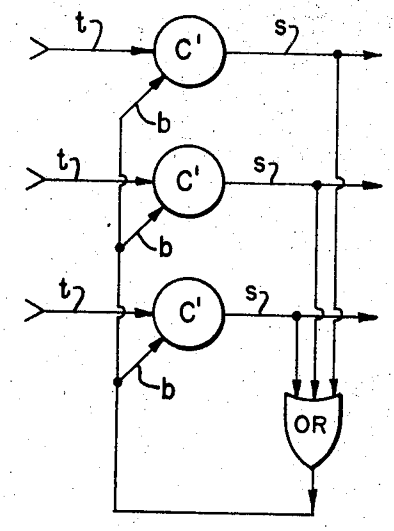
FIG. 17 is a schematic diagram of a multi-input finite resolution arbiter using C′ elements.

An analogous multi-input FR-arbiter using C′ elements instead of C elements is shown in FIG. 17. Its operation is similar to the above circuit.

Figure 18:
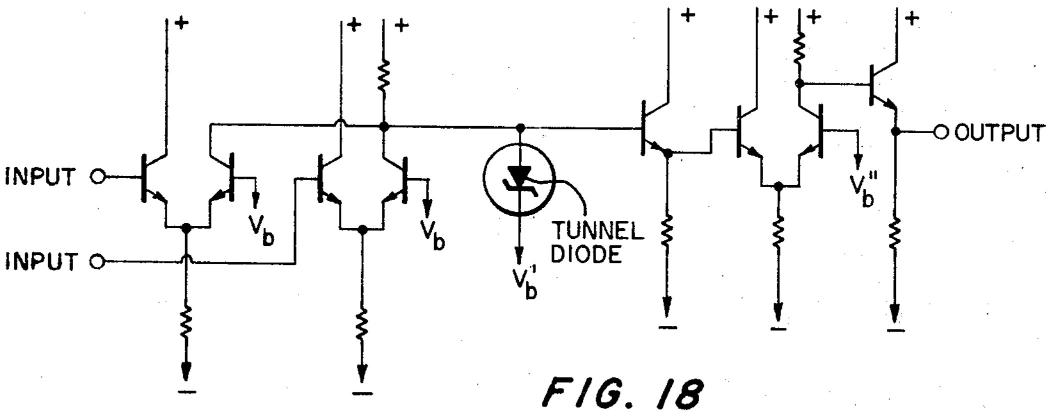
FIG. 18 is a schematic diagram of an emitter coupled logic-tunnel diode implementation of a C element.

The important of the FR-arbiter circuit using the C elements is that nature provides components for construction of quality C elements. Tunnel diodes and other devices which have hysteresis or negative resistance can be utilized for construction of C-circuits. A circuit for C-element using ECL gates and tunnel diodes is shown in FIG. 18. In this circuit the fast switching and ultra unstable negative region of tunnel diode is used to advantage to obtain a C-element which has very narrow conflict region and which gets out of meta stable state fast. Both of these properties are very desirable.

Figure 19:
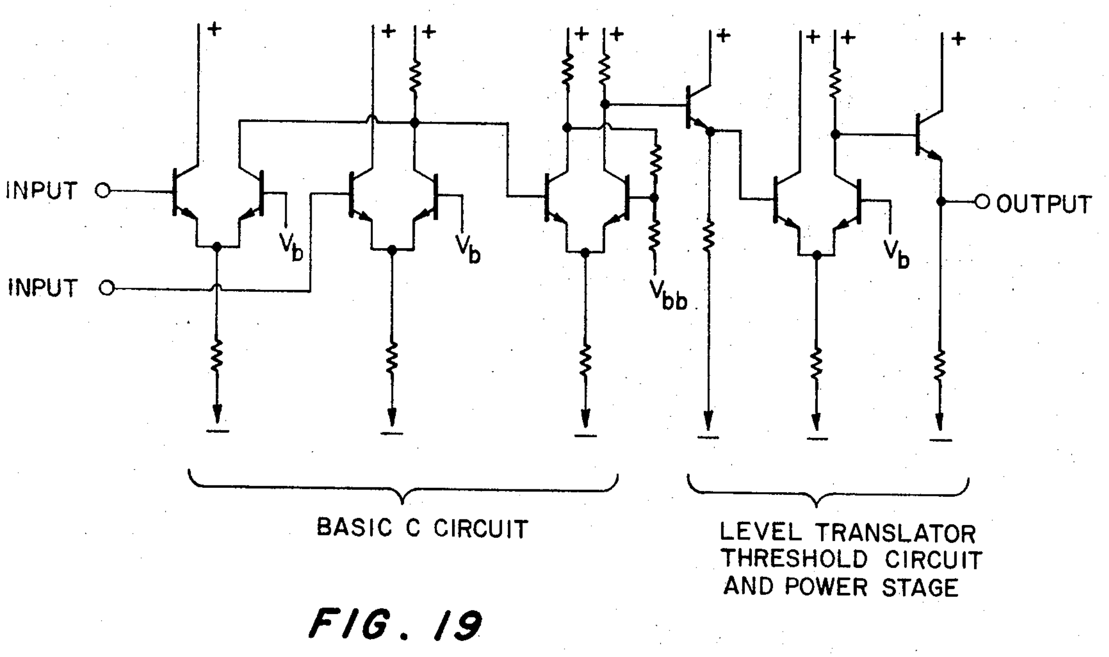
FIG. 19 is a schematic diagram of an emitter coupled logic circuit of a C element.

A circuit for C-element using ECL gates alone is shown in FIG. 19. This circuit may not be as good as the circuit above but it has the advantage that it uses only one kind of gate — a fact which is important in construction of integrated circuits.

Figure 20:
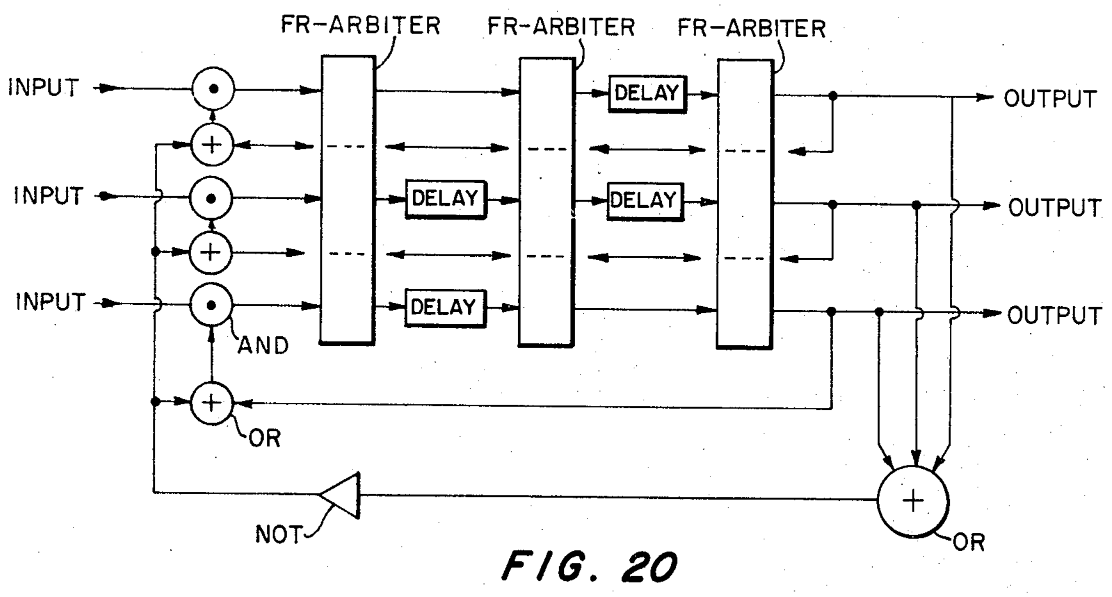
FIG. 20 is a multi-input arbiter block diagram.

A multi-input arbiter can be directly implemented using the scheme used in the case of two input arbiters. A schematic for multi-input arbiter is shown in FIG. 20. The delays on different lines in between two stages are in increments of $\Delta$ where $\Delta$ is greater than twice the length of resolution window. Just as in the case of two input arbiters, these delays help separate signals which may get through a stage because they fall in resolution window. The gates on the extreme left initialize all but the input which gets through the final stage. This initialization is necessary for full utilization of the *n*-stages at the next operation of the arbiter.

Figure 21:
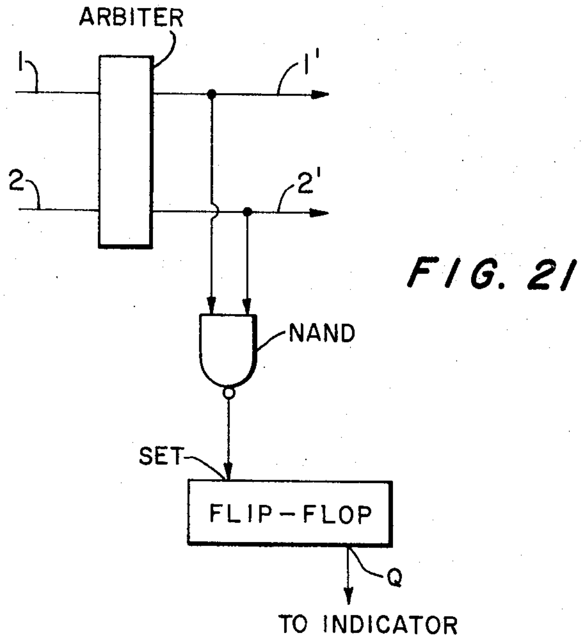
FIG. 21 is a block diagram of a fault detector.

It was stated that the probability of failure of the arbiter can be reduced to as small as one desires. This means that we could construct arbiters whose mean time between failure is very large such as one in a 1,000 years. This means that statistically speaking the failure probability is negligible but it does not absolutely rule out the possibility of a failure. Fortunately a detection circuit can easily tell if a failure has occurred in the operation of the arbiter (FIG. 21). This is good because if at the end of desired computation in a computer using arbiters if no error was signalled, we can be assured that arbitrations were performed correctly and if other things that can affect computation did not happen the computation was performed as desired.

The detection circuit is a high speed NAND gate that detects if both of the outputs of a two input arbiter are 1 at any time. If the wires are both 1 for long enough to influence any thing at all, the NAND gate puts out a signal which sets the flip flops and the flip flop remembers that a fault has occurred. In the case of multi-input arbiters instead of the NAND gate we need a threshold circuit which detects if more than one wire is 1 at the same time.

What is claimed is:

1. An infinite-resolution arbiter circuit comprising:

a first and second finite resolution arbiter circuit each having at least two inputs and corresponding outputs, each said finite resolution arbiter circuit providing signals on each output when signals are applied within the time resolution capability of the arbiter, each said finite resolution arbiter circuit providing a signal on only the output corresponding to the input to which a signal is applied at a time earlier than the resolution time of the finite resolution arbiter with respect to a signal applied to the other input of the finite resolution arbiter, one input of the second finite resolution arbiter being connected to one output of the first finite resolution arbiter by a time delay element, the other input of the second arbiter being connected directly to the other output of the first finite resolution arbiter, the time delay of the delay element being greater than the sum of the resolution times of the first and second finite resolution arbiters, whereby only one signal is obtained within known time at an output of the second finite resolution arbiter regardless of how close in time signals are applied to the inputs of the first finite resolution arbiter with very, very low possibility that the other signal might also be obtained on the other output of the second finite resolution arbiter.

2. A finite-resolution arbiter circuits comprising a first and second C′ circuit, the output of each C′ circuit being connected to the blocking input of the other C′ circuit, the transmit inputs of the C′ circuits constituting the inputs of the arbiter circuit, and the output terminals of the C′ circuits constituting the corresponding outputs of the arbiter circuit, each said C′ circuit comprising, a set-reset flip-flop circuit, said flip-flop circuit comprising a first and second NAND gate each having two inputs and one output, the output of each gate being connected to one input of the other gate to form the flip flop circuit, the unconnected input of one NAND gate being designated a "set" input of the flip flop, the unconnected input of the other NAND gate being designated as the "reset" input, the output of the NAND gate to which the reset input is connected being designated as the output of the flip flop, a threshold element connected to said flip flop output and to the output of the C′ circuit, said threshold element being a NOT gate, the threshold being adjusted to be between the metastable state level and the level of the output in the "set" condition, the reset input of the flip flop being the transmit input of the C′ circuit and the set input of the flip flop being the blocking input of the C′ circuit.

3. A finite-resolution arbiter circuit comprising, a first and second C′ circuit, each said C′ circuit comprising, a set-reset flip-flop circuit, said flip flop circuit comprising a first and second NAND gate each having two inputs and one output, the output of each gate being connected to one input of the other gate to form the flip-flop circuit, the unconnected input of one NAND gate being designated a "set" input of the flip flop, the unconnected input of the other NAND gate being designated as the "reset" input, the output of the NAND gate to which the reset input is connected being designated as the output of the flip flop, a threshold element connected to said flip flop output and to the output of the C′ circuit, said threshold element being a NOT gate, the threshold being adjusted to be between the metastable state level of the flip flop and the level of the output of the flip flop in the "set" condition, the reset input of the flip-flop being the transmit input of the C′ circuit and the set input of the flip flop being the blocking input of the C′ circuit, a first and second delay element, said first delay element being connected between the transmit input of the first C′ circuit and the blocking input of the second C′ circuit, said second delay element being connected between the transmit input of the second C′ circuit and the blocking input of the first C′ circuit, the transmit inputs of the C′ circuits constituting the inputs of the arbiter circuit, and the output terminal of the C′ circuits constituting the corresponding output of the arbiter circuit.

4. A finite resolution arbiter circuit comprising, an OR circuit, a plurality of C′ circuits, each said C′ circuit comprising, a set-reset flip flop circuit, said flip flop circuit comprising a first and second NAND gate each having two inputs and one output, the outputs of each gate being connected to one input of the other gate to form the flip-flop circuit, the unconnected input of one NAND gate being designated a "set" input of the flip flop, the unconnected input of the other NAND gate being designated as the "reset" input, the output of the NAND gate to which the reset input is connected being designated as the output of the flip flop, a threshold element connected to said flip flop output and to the output of the C′ circuit, said threshold element being a NOT gate, the threshold being adjusted to be between the meta-stable state level of the flip flop and the level of the output of the flip flop in the "set" condition, the reset input of the flip flop being the transmit input of the C′ circuit and the set input of the flip flop being the blocking input of the C′ circuit, the outputs of said C′ circuits being connected to the inputs of said OR circuit, the output of said OR circuit being connected to the blocking inputs of said C′ circuits, the transmit inputs of the C′ circuits constituting the inputs of the arbiter circuits, and the output terminals of the C′ circuits constituting the corresponding outputs of the arbiter circuit.

5. A finite resolution arbiter circuit comprising:

a NOR circuit, a plurality of C circuits, each said C circuit having at least two inputs and one output, the output of the C circuit being a zero when all inputs are zero, the output of the C circuit being a one when all inputs are one, the output of the C circuit being unchanged by a change in the inputs unless all inputs are either ones or zeros, the outputs of said C circuits being connected to the inputs of said NOR circuit, the output of said NOR circuit being connected to an input of each of the plurality of C circuits, the other inputs of the C circuits constituting the inputs of the arbiter circuit.

6. An infinite resolution arbiter circuit comprising:

a first and second arbiter circuit each having finite resolution and a plurality of inputs and the same number of outputs, one input of the second arbiter being directly connected to an output of the first arbiter, a second input of the second arbiter being connected to a different output of the first arbiter through a first time delay element whose time delay is greater than the sum of the resolution of the first and second arbiters, succeeding inputs of the second arbiter being connected to different outputs of the first arbiter through time delay elements which differ from each other and said first time delay by a time delay at least as great as the sum of the resolutions of the first and second arbiters, and means for initializing the inputs to the first arbiter in response to outputs of the second arbiter.

said finite resolution arbiter circuit providing signals on each output when signals are applied within the time resolution capability of the arbiter, said arbiter circuit providing a signal on only the output corresponding to the input to which a signal is applied at a time earlier than the resolution of the arbiter with respect to signals applied to the other inputs of the arbiter.

7. An infinite resolution arbiter circuit comprising:

a plurality of finite resolution arbiter stages, each having two inputs and two outputs, one input of any stage other than the first stage being directly connected to an output of the preceding stage, and the other input of any stage other than the first stage being connected to the other output of the preceding stage by a time delay element whose delay is greater than the sum of the resolution times of the connected stages, said finite resolution arbiter circuit providing signals on each output when signals are applied within the time resolution capability of the arbiter, said arbiter circuit providing a signal on only the output corresponding to the input to which a signal is applied at a time earlier than the resolution of the arbiter with respect to signals applied to the other inputs of the arbiter.

8. A finite-resolution arbiter circuit comprising:

a first and second C′ circuit, each said C′ circuit having a transmit input, a blocking input, and one output, and being so constructed and arranged that:

said C′ circuit output is a one when the transmit input becomes a one before the blocking input becomes a one, said C′ circuit output is a zero when the blocking input becomes a one before the transmit input becomes a one, said CC′ circuit output becomes a zero when the transmit input is a zero regardless of whether the blocking input is a one or a zero, the output of each C′ circuit being connected to the blocking input of the other C′ circuit, the transmit inputs of the C′ circuits constituting the inputs of the arbiter circuit, and the output terminals of the C′ circuits constituting the corresponding outputs of the arbiter circuit.

9. A finite-resolution arbiter circuit comprising, a first and second C′ circuit, each said C′ circuit having a transmit input, a blocking input, and one output, and being so constructed and arranged that:

said C′ circuit output is a one when the transmit input becomes a one before the blocking input becomes a one, said C′ circuit output is a zero when the blocking input becomes a one before the transmit input becomes a one, said C′ circuit output becomes a zero when the transmit input is a zero regardless of whether the blocking input is a one or a zero, first and second delay elements, said first delay element being connected between the transmit input of the first C′ circuit and the blocking input of the second C′ circuit, said second delay element being connected between the transmit input of the second C′ circuit and the blocking input of the first C′ circuit, the transmit inputs of the C′ circuits constituting the inputs of the arbiter circuit, and the output terminals of the C′ circuits constituting the corresponding outputs of the arbiter circuit.

10. A finite-resolution arbiter circuit comprising:

an OR circuit, a plurality of C′ circuits, each said C′ circuit having a transmit input, a blocking input, and one output, and being so constructed and arranged that:

said C′ circuit output is a one when the transmit input becomes a one before the blocking input becomes a one, said C′ circuit output is a zero when the blocking input becomes a one before the transmit input becomes a one, said C′ circuit output becomes a zero when the transmit input is a zero regardless of whether the blocking input is a one or a zero, the outputs of said C′ circuits being connected to the inputs of said OR circuit, the output of said OR circuit being connected to the blocking input of said C′ circuits, the transmit inputs of the C′ circuits constituting the inputs of the arbiter circuit, and the output terminals of the C′ circuits constituting the corresponding outputs of the arbiter circuit.

* * * * *

UNITED STATES PATENT OFFICE
CERTIFICATE OF CORRECTION

Patent No. 3,824,409 Dated July 16, 1974

Inventor(s) Suhas S. Patil

It is certified that error appears in the above-identified patent and that said Letters Patent are hereby corrected as shown below:

Insert as the second paragraph in the section entitled "Abstract":

--The invention herein described was made in the course of work performed under a contract with the Department of the Navy.--

Signed and sealed this 19th day of November 1974.

(SEAL)
Attest:

McCOY M. GIBSON JR.
Attesting Officer

C. MARSHALL DANN
Commissioner of Patents